US007921466B2

(12) United States Patent
Garcia Garcia et al.

(10) Patent No.: US 7,921,466 B2
(45) Date of Patent: Apr. 5, 2011

(54) METHOD OF USING AN ATOMIC FORCE MICROSCOPE AND MICROSCOPE

(75) Inventors: Ricardo Garcia Garcia, Madrid (ES); Tomás Raul Rodriguez Frutos, Madrid (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 296 days.

(21) Appl. No.: 11/922,844

(22) PCT Filed: Feb. 21, 2006

(86) PCT No.: PCT/ES2006/070016
§ 371 (c)(1),
(2), (4) Date: Nov. 3, 2008

(87) PCT Pub. No.: WO2007/036591
PCT Pub. Date: Apr. 5, 2007

(65) Prior Publication Data
US 2009/0229019 A1 Sep. 10, 2009

(30) Foreign Application Priority Data
Jun. 24, 2005 (ES) .................................. 200501555

(51) Int. Cl.
*G01Q 10/00* (2010.01)
*G01Q 20/00* (2010.01)
*G01Q 60/24* (2010.01)
(52) U.S. Cl. .................................. 850/33; 850/5; 850/1
(58) Field of Classification Search .................... 850/33, 850/38, 5, 1, 3, 4; 250/306–308
See application file for complete search history.

(56) References Cited

U.S. PATENT DOCUMENTS

| 5,519,212 | A  | * | 5/1996  | Elings et al. ................... 850/38 |
| 5,646,339 | A  | * | 7/1997  | Bayer et al. ..................... 850/37 |
| 6,185,991 | B1 | * | 2/2001  | Hong et al. ....................... 850/5 |
| 6,215,121 | B1 | * | 4/2001  | Fujihira et al. ................... 850/1 |
| 6,597,185 | B1 | * | 7/2003  | Talanov et al. ................... 850/1 |
| 6,779,387 | B2 | * | 8/2004  | Degertekin ...................... 850/8 |
| 6,955,078 | B2 | * | 10/2005 | Mancevski et al. ............. 850/33 |
| 7,521,257 | B2 | * | 4/2009  | Adams et al. ................. 250/234 |

(Continued)

OTHER PUBLICATIONS

D. Chernoff, "High Resolution Chemical Mapping Using Tapping Mode AMF with Phase Contrast", Proc. Microscopy and Microanalysis, New York, 1995, p. 888.

(Continued)

*Primary Examiner* — Bernard E Souw
*Assistant Examiner* — Brooke Purinton
(74) *Attorney, Agent, or Firm* — Wenderoth, Lind & Ponack, LLP.

(57) ABSTRACT

The invention relates to a method of using an atomic force microscope and to a microscope. The inventive method comprises the following steps consisting in at least performing bimodal excitation of a microlever (M) which is disposed on a sample and analysing at least: the variation in the oscillation amplitude ($A_i$) of an output signal ($A_i \cos(\omega_i t - \phi_i)$) that is representative of the response from the microlever (M) to the excitation of one of the natural vibration modes thereof, in order to obtain topographic information in relation to the sample; and to the variation in the phase ($\phi_j$) of an output signal ($A_j \cos(\omega_j t - \phi_j)$) that is representative of the response from the microlever (M) to the excitation of another natural vibration mode thereof, in order to obtain compositional information in relation to the sample. The inventive microscope is adapted to be used with the aforementioned method.

14 Claims, 4 Drawing Sheets

U.S. PATENT DOCUMENTS

| | | | |
|---|---|---|---|
| 7,584,653 B2* | 9/2009 | Su et al. | 73/105 |
| 2004/0094711 A1* | 5/2004 | Lee et al. | 250/306 |
| 2004/0129064 A1 | 7/2004 | Hinterdorfer et al. | |
| 2004/0134265 A1* | 7/2004 | Mancevski | 73/105 |
| 2005/0199047 A1* | 9/2005 | Adams et al. | 73/105 |
| 2009/0229020 A1* | 9/2009 | Adams et al. | 850/33 |
| 2010/0011471 A1* | 1/2010 | Jesse et al. | 850/21 |

OTHER PUBLICATIONS

J. Tamayo et al., "Effects of elastic and inelastic interactions on phase contrast images in tapping-mode scanning force microscopy", Applied Physics Letters, vol. 71, No. 16, Oct. 1997, p. 2394.

J. P. Cleveland et al., "Energy dissipation in tapping-mode atomic force microscopy", Applied Physics Letters, vol. 72, No. 20, May 1998, p. 2613.

G. Bar et al., "Effect of Viscoelastic Properties of Polymers on the Phase Shift in Tapping Mode Atomic Force Microscopy", Langmuir 14, Aug. 1998, p. 7343.

J. Tamayo et al., "Relationship between phase shift and energy dissipation in tapping-mode scanning force microscopy," Applied Physics Letters, vol. 73, No. 20, Jul. 1998, p. 2926.

M. Stark et al., "From Images to Interactions: High-Resolution Phase Imaging in Tapping-Mode Atomic Force Microscopy," Biophysical Journal, vol. 80, Jun. 2001, p. 3009.

R. Hillenbrand et al., "Higher-harmonics generation in tapping-mode atomic-force microscopy: Insights into the tip-sample interaction," Applied Physics Letters, vol. 76, No. 23, Jun. 2000, p. 3478.

T. Rodríguez et al., "Tip motion in amplitude modulation (tapping-mode) atomic-force microscopy: Comparison between continuous and point-mass models," Applied Physics Letters, vol. 80, No. 9, Mar. 2002, p. 1646.

R. Garcia et al., "Attractive and repulsive tip-sample interaction regimes in tapping-mode atomic force microscopy," Physical Review B, vol. 60, No. 7, Aug. 1999, p. 4961.

A. San Paulo et al., "Tip Surface forces, amplitude, and energy dissipation in amplitude-modulation (tapping mode) force microscopy," Physical Review B, vol. 64, Oct. 2001, p. 193411.

T. Rodriguez et al., "Compositional mapping of surfaces in atomic force microscopy by excitation of the second normal mode of the microcantilever," Applied Physics Letters, vol. 84, No. 3, Jan. 2004, p. 449.

J. Fritz et al., "Translating Biomolecular Recognition into Nanomechanics", Science 288, 316 (Apr. 2000).

S. Lin et al., "Analytical solutions of the first three frequency shifts of AMF non-uniform probe subjected to the Lennard-Jones force," Ultramicroscopy 106 (2006), p. 508.

* cited by examiner

US 7,921,466 B2

METHOD OF USING AN ATOMIC FORCE MICROSCOPE AND MICROSCOPE

SECTOR OF THE ART

In an initial aspect, the present invention relates in general to a method of use of an atomic force microscope (AFM) by means of amplitude modulation in order to analyse a sample at the nanometric scale, and in particular it relates to the method of using said AFM by means of simultaneous excitation of various normal vibration modes of the microlever thereof.

A second aspect of this invention relates to a microscope adapted for applying the method proposed by the first aspect of the invention.

STATE OF THE PRIOR ART

In just a few years, atomic force microscopes (AFM) have, in their dynamic modes, and in particular in the amplitude modulation mode, become of the most powerful and versatile techniques for the characterisation at the nanometric scale of a wide range of materials such as biological molecules, polymers, semiconductors, ceramic materials or organic molecules. Moreover, these instruments can function both in air and in liquid mediums, which permits monitoring of dynamic processes such as crystal growth or the study of biomolecular interactions in solution. As a consequence of their extremely high resolution (lateral and vertical) and the robustness of their functioning, atomic force microscopes have become introduced both into research laboratories and into departments for the innovation and characterisation of technological sectors such as the development of polymers or integrated circuits, to cite two examples. The potential of AFM microscopes in both basic research and in their technological applications would spread notably if their high spatial resolution were to be accompanied by a capacity to measure other physical or chemical properties such as chemical composition or mechanical properties. Nevertheless, the capacity to obtain compositional or mechanical contrast by means of the dynamic modes of AFM has been inferior and not so direct as topographical measurements.

The most widespread AFM is known as amplitude modulation AFM (its most common commercial name is tapping mode AFM) and consists of excitation of the microlever at the resonance frequency (fundamental) and of establishing a feedback system based on monitoring the amplitude of the oscillation.

Since 1993, various schemes have been put forward for combining topography and compositional contrast by means of the dynamic modes of AFM. The most notable has consisted of measuring the phase difference existing between the oscillation signal and the exciting force. Measurement of the phase difference is done jointly and simultaneously with measurement of the amplitude. In this case the phase was proposed for obtaining information on compositional variations (D. Chernoff, *Proc. Microscopy and Microanalysis*, New York 1996; J. Tamayo and R. Garcia, *Appl. Phys. Lett.* 71, 2394 (1997); J. P. Cleveland et al. *Appl. Phys. Lett.* 72, 2613 (1998); G. Bar et al. *Langmuir* 14, 7343 (1998)). These measurements have allowed images to be obtained where the various components of polymers, semiconductors or organic compounds are visualised. Nevertheless, different works have demonstrated that the phase signal corresponding to the oscillation is governed by the inelastic energy dissipated between the tip and the sample. This implies that different combinations of inelastic processes and elastic properties of the material can give rise to the same phase difference, with which the phase difference of the first harmonic does not provide us with any quantitative information on the properties of the material (Tamayo, Garcia *Applied Phys. Letters* 73, 2926 (1998)). Moreover, it has been demonstrated that the phase signal also includes a topographical component which makes separation between the topographical and compositional information much more difficult (M. Stark et al. *Biophys. J.* 80, 3009 (2001)).

Other methods have recently been put forward for combining topographical information with chemical information, such as the patent (P. Hinterdorfer, J. Nelson, US Patent Application US-A-20040129064), nevertheless, this type of scheme is only applicable for measuring specific interactions among biological molecules, which considerably restricts the range of application of the method.

Various factors can help to explain the present limitations of atomic force microscopy for obtaining information beyond topography. Notable among them is the consideration of the microlever of AFM as a monomodal mechanical system, in other words, the microlever is considered as a mechanical system characterised by a single resonance frequency (the fundamental). Consequently, the excitation is carried out at frequencies close to the resonance frequencies. Nevertheless, a microlever has various vibration modes, all of them at frequencies higher than the fundamental. For example, for a lever in the form of a rectangular prism and with uniform density, the ratio between frequencies is $v_0$, 6.39 $v_0$, $17.9$ $v_0$, .... The contributions of the modes higher than the oscillation amplitude in atomic force microscopy are fairly small, nevertheless, they are appreciable in some experimental situations (R. Hillenbrand et al. *Appl. Phys. Lett.* 76, 3478 (2000); Stark T. R. Rodriguez, R. Garcia, *Appl. Phys. Lett.* 80, 1646 (2002)).

DESCRIPTION OF THE INVENTION

In an initial aspect, the present invention relates to a method of use of an atomic force microscope (AFM) by means of amplitude modulation, of the type which, according to art that is known in itself, comprises exciting a natural vibration mode of a microlever of said microscope, arranged on a sample to be examined, and analysing the variation in the amplitude of oscillation of an output signal representing the response of that microlever to that excitation (in general the response of the tip of the microlever), in order to obtain topographical information on the sample.

The method proposed by the first aspect of this invention comprises additionally exciting at least one other natural vibration mode of that microlever, preferably simultaneously, as well as the excitation of that natural mode and analysing at least the variation in the phase of an output signal representing the response of that microlever to that additional excitation (in general the response of the tip of the microlever), in order to obtain compositional information on the sample.

In general, said additional excitation used to obtain such compositional information is carried out by means of an excitation signal at a frequency higher than the frequency of an excitation signal used to obtain said topographical information.

For an example of embodiment of the method, this consists of carrying out said excitations, of which there are at least two, of said natural vibration modes of the microlever by means of a single excitation signal comprising the sum of those two excitation signals, and then decomposing an output signal representing the response of that microlever to that excitation, separating the parts of the signal corresponding to the response to each of the excitations, of which there are at least two, which are then subjected to the said analysis of variation of their amplitude and/or phase.

For a preferred example of embodiment, said natural modes correspond to the first two natural modes of the microlever, though for other examples of embodiment they correspond to any pair of natural vibration modes of the microlever, consecutive (for example the first and second or the third and fourth) or non-consecutive (for example the first and third).

For another example of embodiment the proposed method consists of carrying out at least a third excitation consisting of exciting another natural vibration mode of the microlever and analysing the variation in the amplitude and/or phase of an output signal representing the response of that microlever to that third excitation in order to obtain topographical and/or compositional information on the sample.

For other examples of embodiment, the method comprises exciting more than two or three natural modes of the microlever, and in short the present invention, in its first aspect, takes on the multimodal nature of the microlever.

By means of that simultaneous multiple excitation of various normal vibration modes of the microlever, as many channels are simultaneously obtained for investigating the nanometric scale properties of the sample as there are excitation frequencies. As has been pointed out earlier, for the proposed method, the channel defined by the lowest frequency is used to form an image of the topography of the sample while the higher frequency channels are used to form an image/images and/or measure the physical and/or chemical properties of the sample. The theoretical simulations included here show that the proposed method can detect forces of 1 pN, in other words, approximately two orders of magnitude smaller than the most advanced instruments of atomic force microscopy in the amplitude modulation mode.

In a second aspect, the present invention relates to an atomic force microscope adapted for applying the proposed method, in other words, it relates to an atomic force microscope adapted for carrying out a multimodal excitation of a microlever and analysing the effects which that excitation produce on the microlever (in general its tip) when interacting with the sample without mechanically coming into contact with it.

BRIEF DESCRIPTION OF THE FIGURES

The above and other characteristics will be better understood on the basis of the following detailed description of some examples of embodiment with reference to the attached figures, in which.

DETAILED DESCRIPTION OF SOME EXAMPLES OF EMBODIMENT

Figure 1:
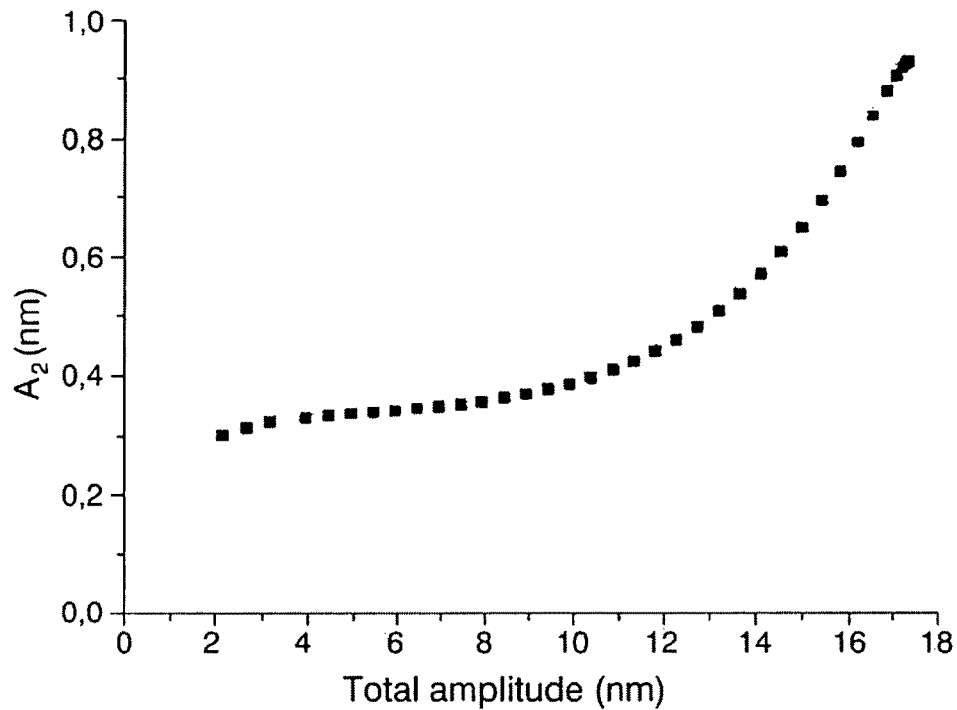
FIG. 1 shows a graph representing the variation in the amplitude of oscillation of the microlever, when excited in a second natural mode, compared to the total amplitude of the microlever for certain simulation data of an example of embodiment.

A series of experimental simulations and trials have been conducted with the aim of demonstrating the goodness of the method and the microscope that are proposed which among others have offered a series of data that are represented by means of the graphs illustrated by FIGS. 1 to 4.

Given below is an explanation of a series of mathematical concepts and expressions on which the simulations have been based, and which explain the behaviour of the proposed microscope, in particular that of the microlever M (see FIGS. 5 and 6) along with the method of use thereof.

The present specification describes the bimodal case, in other words, when two vibration modes are simultaneously excited, which can be the first and second, the first and third, and so on successively, or the second and third, etcetera, and all possible combinations among them. The generalisation to the multimodal case can be directly inferred from what is stated below. In any case, in what follows the natural lower frequency mode is represented with i and the higher frequency with j.

In order to carry out the present invention, the multimodal nature of the microlever M has been assumed, as has the consideration that the effective quality factor increases in the higher modes, Qi>Qj if i>j, as can be seen in the expression:

$$Q_j = \frac{\omega_j}{\frac{a_0}{\rho b h} + a_1 \omega_j^2}$$

where $\omega_j$ is the resonance frequency of mode j, $\rho$ is the density of the material, $a_1$ is the internal damping coefficient, $a_0$ is the damping coefficient with the medium, and b and h are the width and thickness of the microlever M. Consequently, the higher modes will magnify the response of the microlever to the interactions and they will therefore be more sensitive both for measuring topographical properties and for obtaining information on the mechanical and compositional properties of the surface. Nevertheless, the higher modes present very small amplitudes in comparison with the fundamental mode. As has been stated earlier on here, the simultaneous excitation is proposed of various oscillation modes of the microlever M, which may be two, three, four et cetera, though the example of preferred embodiment is the bimodal case already mentioned, in other words, that of exciting two natural vibration modes.

The viability of the invention is based on the numerical analysis of the dynamic behaviour of an atomic force microscope, a task that has been carried out over several years in the Forces and Tunnel Laboratory of the CSIC (R. Garcia, A. San Paulo, *Phys. Rev. B* 60, 4961 (1999), A. San Paulo, R. Garcia, *Phys. Rev. B* 64, 193411 (2001), T. R. Rodriguez, R. Garcia, *Appl. Phys. Lett.* 80, 1646 (2002), T. R. Rodriguez, R. Garcia, *Appl. Phys. Lett.* 82, 446 (2004)).

First of all, the microlever is considered to be a continuous system w(x,t) which is externally excited and which interacts with the sample via a long range interaction (van de Waals forces) and a short range interaction by means of a JKR model. Under these conditions the equation of motion is:

$$\frac{EI}{L^4}\frac{\partial^4}{\partial x^4}[w(x,t)] + a_1\frac{\partial w(x,t)}{\partial t} + bh\rho\frac{\partial^2}{\partial x^2}w(x,t) = F_{exc} + F_{med} + F_{is}$$

where E is Young's modulus, I is the moment of inertia produced by the microlever, and L is the length. $F_{exc}$, $F_{med}$ and $F_{is}$ are respectively the excitation force, force of friction with the medium, and interaction force per unit length.

In this specification, the communications routes with the sample permitting the separate analysis of amplitudes and phases of the oscillations produced in the microlever M are referred to as the communication channels with the sample, and for some examples of embodiment of the microscope proposed by the second aspect of this invention these channels physically exist, as will be described below.

The different channels arise naturally due to considering the microlever M of an AFM as being a mechanical system containing a lot of vibration auto-modes. The excitation of the first mode and the non-linear nature of the interaction generate the excitation of higher harmonics of the first mode. Nevertheless, it has been demonstrated that the amplitude of these components under relevant experimental conditions is approximately four orders of magnitude smaller than the fundamental, which makes their experimental use very difficult (T. R. Rodriguez, R. Garcia, *Appl. Phys. Lett.* 80, 1646 (2002)). In order to overcome this limitation, this present invention proposes the simultaneous excitation of two oscillation modes with the aim of establishing a ratio between the amplitudes of the lowest frequency mode and the higher mode of approximately 1-10%. The first lowest frequency mode is reserved for acquiring a topographical image while the higher mode is reserved for obtaining information on the mechanical or chemical properties of the material. The bimodal excitation is preferably done in such a way that there does not exist any interference between the two signals.

So that the different modes of the fundamental can have an acceptable component, the invention proposes the simultaneous excitation of various modes of the microlever M in the following way:

$$F_{exc}(x,t) = \sum_i^n F_i \cos\omega_i t$$

where $F_i$ and $\omega_i$ represent the excitation force and frequency of the mode of the microlever. As a consequence of the above excitation, 2n communications channels will be generated with the sample. For each mode, there are two channels available, one for the amplitude A and the other due to the phases (D. For the sake of brevity and in order to demonstrate the concept of multimodal functioning, the bimodal case will be explained.

The general scheme of the bimodal functioning will be as follows. The amplitude $A_i$ of the lower mode i will be used for forming a first image of the topography of the sample to be analysed while the signals corresponding to the higher mode $A_j$ and $\phi_j$ will preferably be used to provide information on the physical and/or chemical properties of the material (in the case of phase) though it is also possible to use them for completing the topographical characterisation (in the case of amplitude). The bimodal excitation is as follows:

$$F_{exc}(x,t) = F_i \cos\omega_i t + F_j \cos\omega_j t$$

where $\omega_i$ and $\omega_j$ are the frequencies of two normal modes of the microlever meeting the condition j>i. In this way, the amplitude of the higher modes is no longer simply controlled by the excitation due to the harmonics of the fundamental mode, as occurs in a conventional (dynamic) atomic force microscope, but is instead due to a force that can be controlled by the observer.

The numerical simulations that are presented below illustrate the viability of the bimodal functioning concept of an AFM, where i=1 and j=2. For this, the following are shown:

(1) The enabling of the channel associated with the fundamental mode $A_1$ in order to make topographical measurements, (2) The enabling of mode j=2 for distinguishing changes in the properties of the material, and (3) the sensitivity to compositional changes depends on the mode, not on using the phase as a measurement parameter.

FIG. 1 shows that the component of the amplitude $A_2$ of mode 2 in the total amplitude is less than 10% in almost the entire experimental range.

Figure 2:
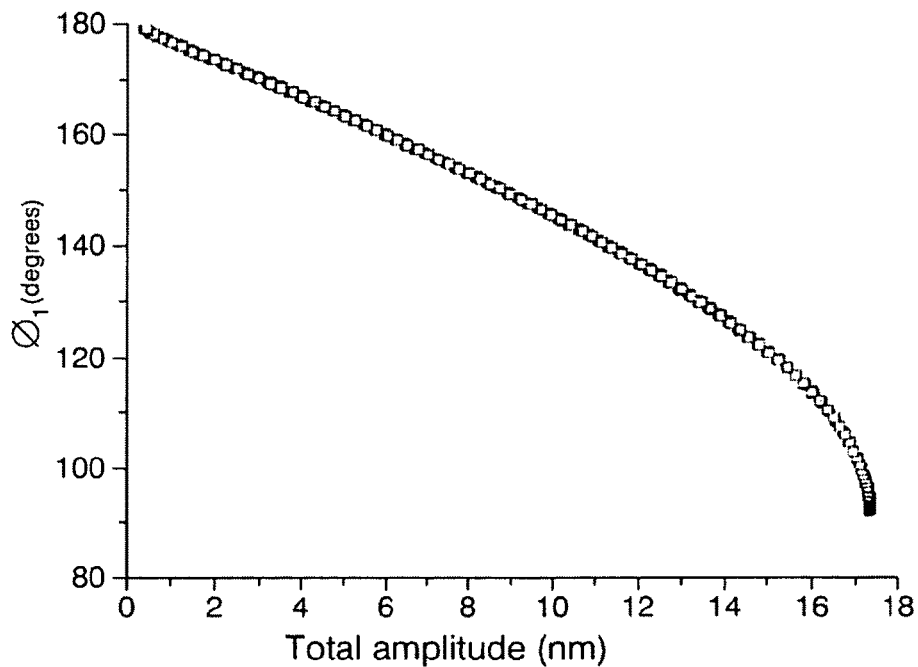
FIG. 2 shows a graph representing the variation in phase difference of the oscillation of the microlever when excited in a first natural mode, compared to the total amplitude of the microlever for certain simulation data of an example of embodiment, for different materials.

FIG. 2 shows how the phase of the first mode $\phi_1$ is not sensitive to the change of properties of the material, in this particular case simulated by means of changes in the Hamacker constant, since the graph represented in FIG. 1 shows the variation in that phase $\phi_1$ for different materials whose Hamacker constants go from H=4.7×10⁻²⁰ J to H=9×10⁻²⁰ J and, as shown in that FIG. 1, no changes occur in the phase $\phi_1$ (although only one curve can be seen, in reality there are several equal curves superimposed, each one representing a different material).

Figure 3:
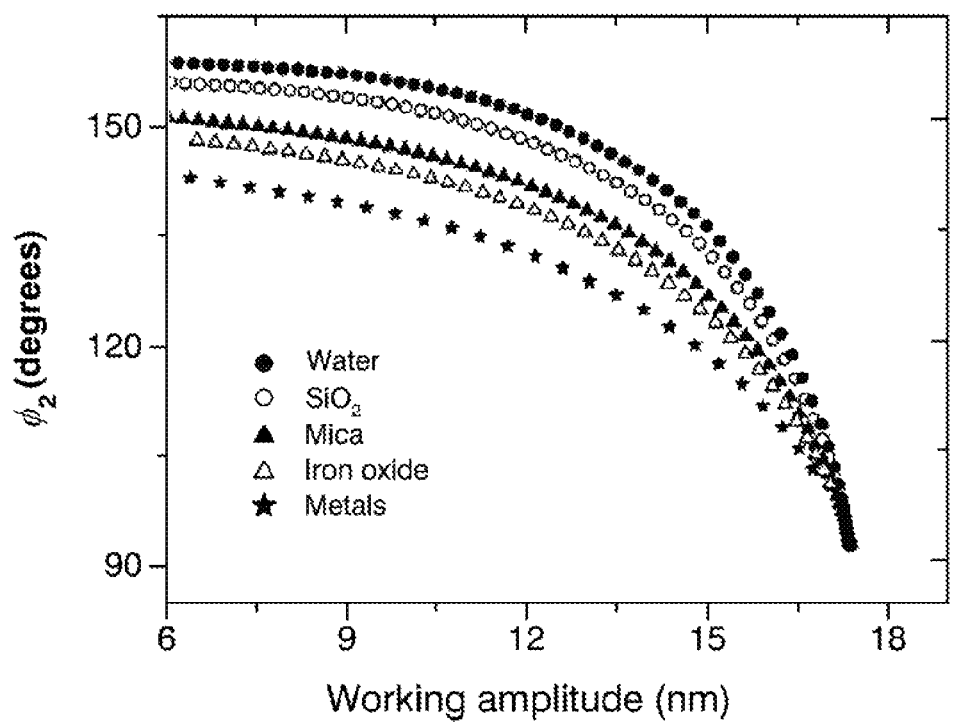
FIG. 3 shows a graph representing the variation in phase difference of the oscillation of the microlever when excited in the second natural mode, compared to the total amplitude of the microlever for certain simulation data of the same example of embodiment as in FIG. 2, for different materials.

This is entirely the opposite of what happens when the phase $\phi_2$ of mode 2 is represented, as can be seen in FIG. 3, which represents the same example of embodiment as FIG. 2 for the same materials, which in this case produced curves of phase $\phi_2$ vs. total or working amplitude which are all different from each other, which gives an idea of the suitability of the analysis of the variation in phase $\phi_2$ in mode 2 for confirming the composition of a sample.

The results shown in FIGS. 1 and 2 have been obtained with the following parameters L, b, h, E, R and ρ for 225 μm, 40 μm, 1.8 μm, 170 Gpa, 20 nm and 2320 kg/m², respectively, where R corresponds to the radius of the tip of the microlever M and for values of $f_1$=48.9 kHz, $k_1$=0.9 N/m, $A_1$=17.4 nm, $Q_1$=255 and $F_1$=60 pN; $f_2$=306.6 kHz, $k_2$=35.22 N/m, $A_2$=0.92 nm, $Q_2$=1001.4 and $F_2$=20 pN.

As has been pointed out above, FIG. 1 shows that the amplitude of the higher mode, or mode 2, lies between 5-10% of the value of the fundamental mode. This difference will allow A1 to be able to carry the topographical signal while the signal for the higher mode is sufficiently high (in the illustrated case, between 0.4 and 1 nm) for being easily detectable with current atomic microscope system (<0.1 nm).

As has also been pointed above, FIG. 2 shows a theoretical simulation where the dependence of the phase change of the fundamental mode ah (in other words, for i=1) is studied for materials of different Hamacker constants (from 4.7×10⁻²⁰ J to 17.2×10⁻²⁰ J) which correspond to different interfaces (water, silicon oxide, mica, iron oxide and metals). All the curves coincide. In other words, when represented against amplitude, the phase of the fundamental mode $\phi_1$ does not depend on the material.

FIG. 3 shows the dependence of the phase of mode two $\phi_2$ with respect to the working amplitude for different materials. A strong dependence on the material can be seen which, as already explained above, makes the variation in the phase of mode two mode $\phi_2$ ideal for confirming the composition of a sample.

Figure 4:
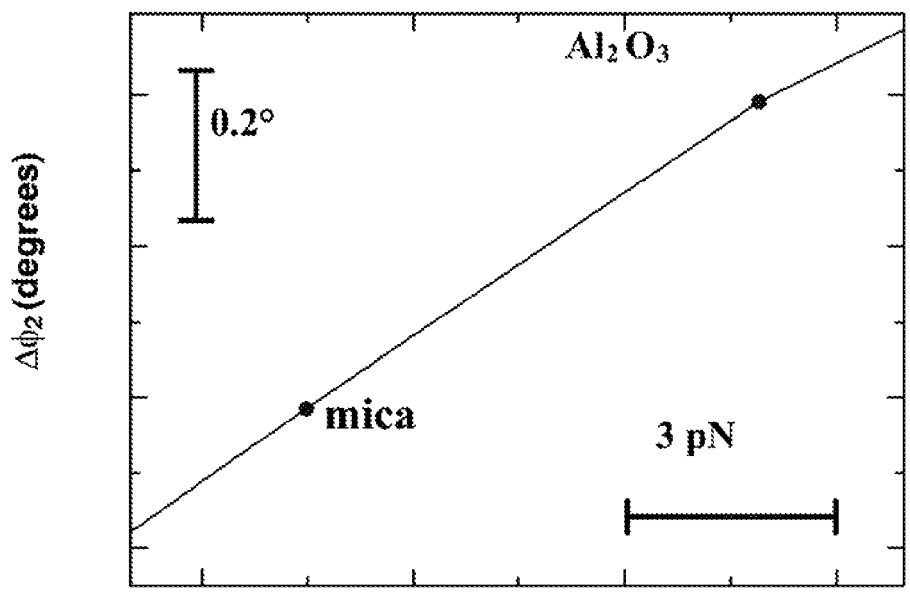
FIG. 4 is an enlarged portion of the graph of FIG. 3.

Equally interesting is the sensitivity of the phase difference of the second mode $\phi_2$ for detecting changes of composition due to minute variations in forces (~1 pN). For example, FIG. 4 shows how phase differences of 0.2° (the present sensitivity in measurements of phase differences is 0.01°) in turn implies a change in forces of several pN. This sensitivity is between approximately one and two orders of magnitude more sensitive than currently existing atomic force microscopes.

Figure 5:
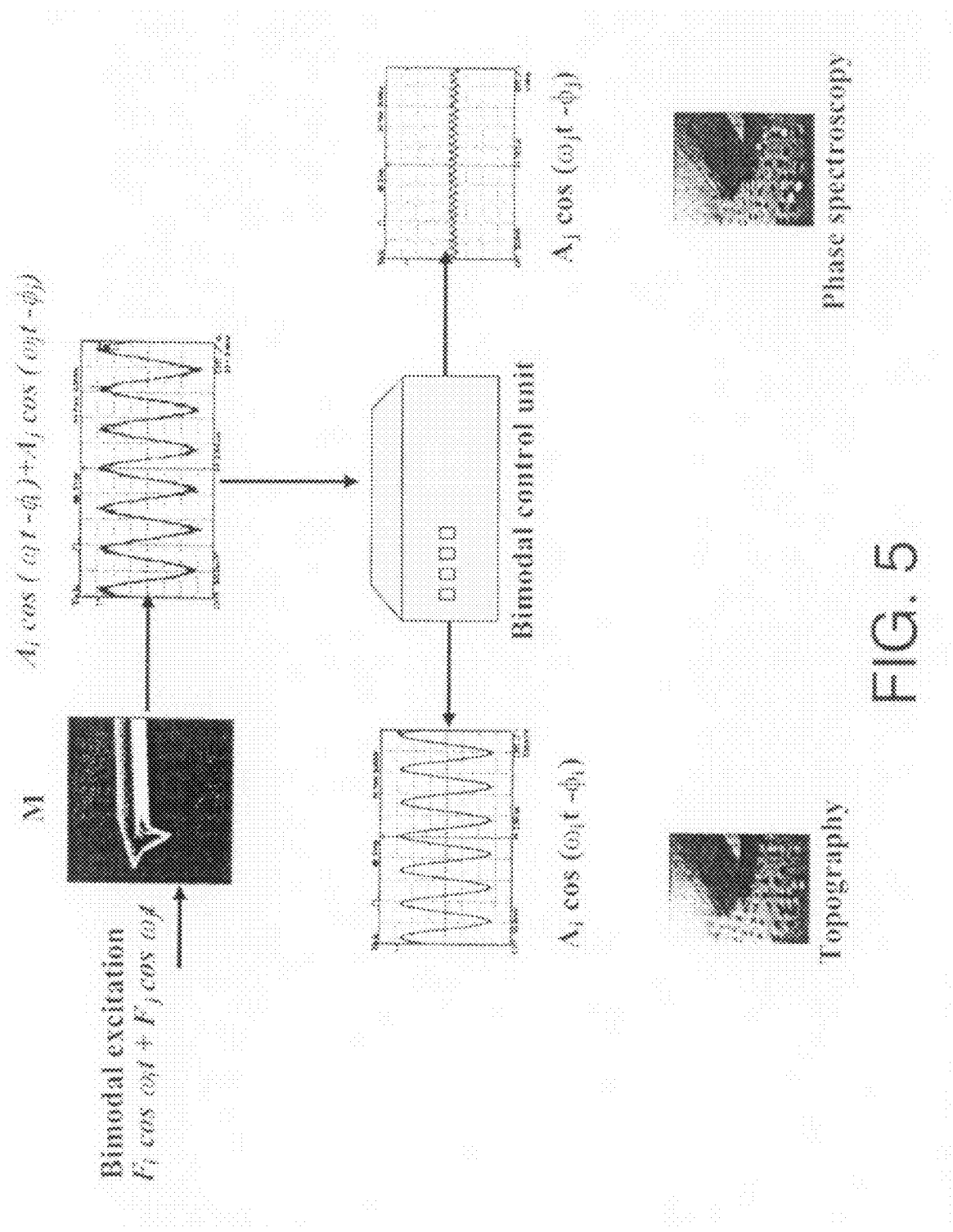
FIG. 5 is a diagram representing the method and the microscope that are proposed, for an example of embodiment.
Figure 6:
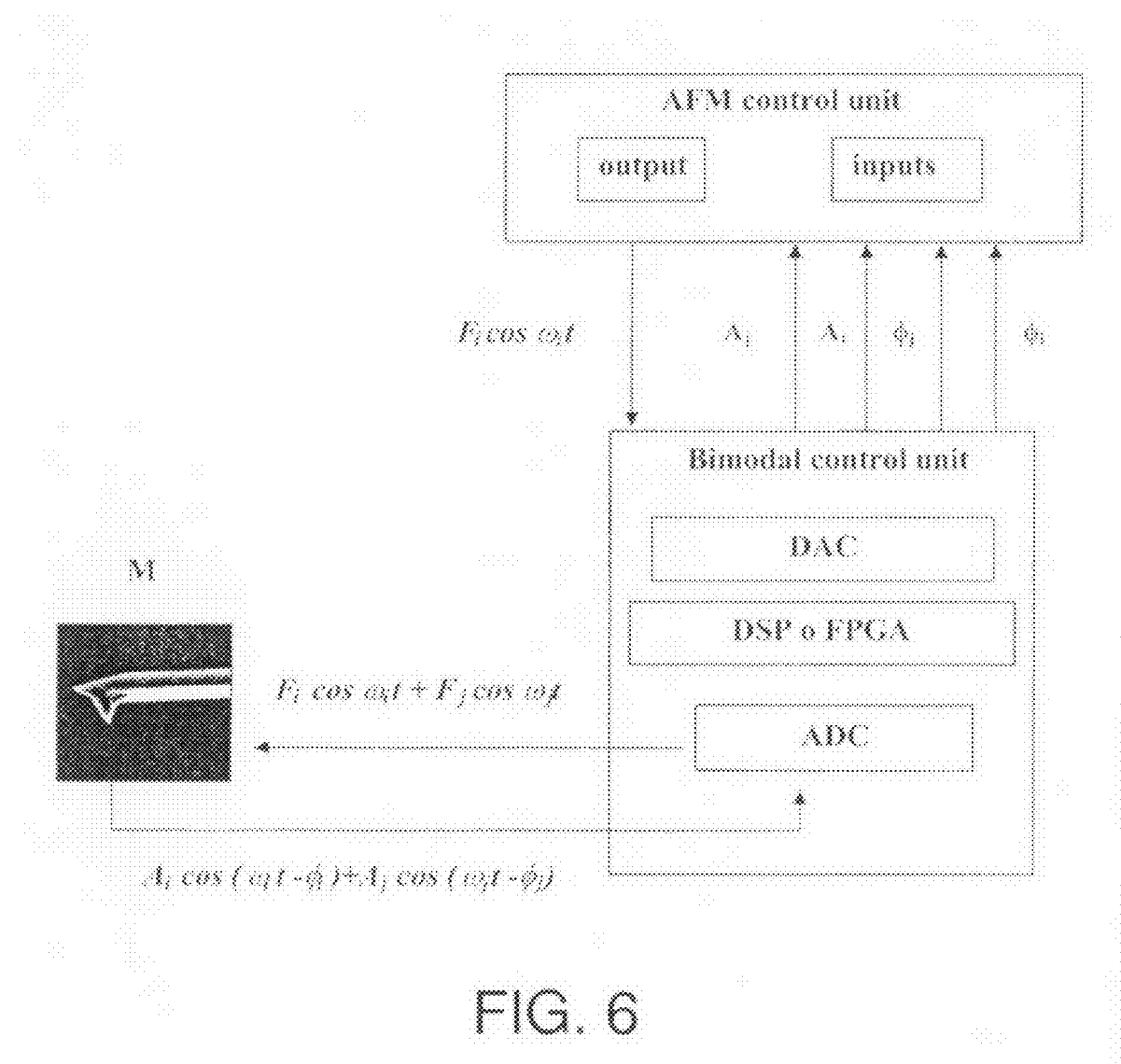
FIG. 6 shows a block diagram of the microscope proposed according to the second aspect of this invention, and some stages of the method proposed by the first aspect, for an example of embodiment.

Having demonstrated, by means of the explanations and results set out in FIGS. 1 to 4, the convenience of analysing the variation in amplitude of the first mode $A_1$ in order to confirm the topography of a sample, or, generically, analysing a natural vibration mode i of the microlever M, in other words, $A_i$, and the convenience of analysing the variation in phase of the second mode $\Phi_2$ in order to confirm the composition of a sample, or, generically, analysing a natural vibration mode j of the microlever M, in other words, $\Phi_j$, we now proceed, with the help of FIGS. 5 and 6, to explain some examples of embodiment of the method and the microscope that are proposed, also representative of a bimodal excitation, though they can be perfectly well extrapolated to excitations of more than two modes.

FIGS. 5 and 6 represent the excitation signal of the first mode as $F_i \cos \omega_i t$ and that of the additional or second mode as $F_j \cos \omega_j t$, where j>i.

As has been explained above for a preferred example of embodiment (which is the one illustrated by FIGS. 5 and 6) the proposed method comprises carrying out both excitations by means of a single excitation signal $F_i \cos \omega_i t + F_j \cos \omega_j t$, composed of the sum of those two excitation signals $F_i \cos \omega_i t$ and $F_j \cos \omega_j t$ and, as indicated by means of an arrow in FIG. 5, applied to the microlever M.

In response to that compound excitation signal $F_i \cos \omega_i t + F_j \cos \omega_j t$, by means of the proposed method a compound output signal $A_i \cos(\omega_i t - \phi_i) + A_j \cos(\omega_j t - \phi_j)$ is obtained, whose waveform is illustrated in FIG. 5.

The proposed method also comprises decomposing that compound output signal $A_i \cos(\omega_i t - \phi_i) + A_j \cos(\omega_j t - \phi_j)$ representing the response of the microlever M (generally of its tip) to that compound excitation signal $F_i \cos \omega_i t + F_j \cos \omega_j t$, separating the parts of the signal which correspond to the responses with regard to each of those excitations, of which there are at least two, which are then subjected to at least the said analyses of variation in their amplitude and/or phase, said parts also being illustrated in FIG. 5 by means of separate waveforms $A_i \cos(\omega_i t - \phi_i)$ and $A_j \cos(\omega_j t - \phi_j)$, with, as is also shown schematically in FIG. 5, the first being used for analysing the topology of the sample and the second for analysing the composition thereof by means of a corresponding phase spectroscopy.

The present invention also refers in a second aspect to an atomic force microscope, some of whose elements are illustrated at a schematic level in FIGS. 5 and 6, and is of the type that comprises a series of elements that are already known in themselves and which are:

a microlever M to be arranged on a sample, a scanning unit associated with that microlever M and adapted for performing a scan with that microlever M on the sample or part thereof, an excitation unit adapted for exciting said microlever M with an excitation signal $F_i \cos \omega_i t$ of frequency substantially equal to that of a natural vibration mode of said microlever M, said excitation representing an excitation force, a force detection unit associated with the excitation unit for at least detecting the forces applied to and/or generated in the microlever M, a detection unit adapted for detecting at least one output signal $A_i \cos(\omega_i t - \phi_i)$ representing the response of the microlever M to that excitation, in order to monitor the variation in the amplitude $A_i$ of oscillation of the output signal $A_i \cos(\omega_i t - \phi_i)$ when performing that scan in order to obtain topographical information on the sample, an image conversion and processing unit adapted for at least transforming said variations in the amplitude $A_i$ of oscillation of the output signal $A_i \cos(\omega_i t - \phi_i)$ into a topographical representation of the sample, and a control unit in communication with the rest of the units of the microscope for at least controlling their functioning.

Unlike conventional microscopes, the microscope proposed by the second aspect of the present invention is adapted for additionally and simultaneously exciting the microlever M with another excitation signal $F_j \cos \omega_j t$ of frequency substantially equal to that of another natural mode of vibration of the said microlever M, this excitation representing another excitation force, and for detecting an additional output signal $A_j \cos(\omega_j t - \phi_j)$ representing the response of the microlever M to that additional excitation, in order to monitor the variation in the phase $\phi_j$ of the additional output signal $A_j \cos(\omega_j t - \phi_j)$ when performing that scan in order to obtain compositional information on the sample.

For one example of embodiment, the additional excitation is carried out by the excitation unit, for which it is adapted, and detection of said additional output signal $A_j \cos(\omega_j t - \phi_j)$ and the corresponding monitoring of the variation in its phase $\phi_j$ is carried out by the detection unit, for which it is adapted.

For another example of embodiment, the additional excitation is carried out by an additional excitation unit, and the detection of $A_j \cos(\phi_j t - \phi_j)$ and the subsequent monitoring of the variation in its phase is carried out by an additional detection unit, the two units forming part of a bimodal control module included in the microscope or external thereto, but in both cases connectable to at least the said control unit for the microscope.

This latter example of embodiment is illustrated in FIG. 6, in which the bimodal control module is labelled as the bimodal control unit, and the part of the microscope to which it is connected is labelled as the AFM control unit, which comprises at least the aforementioned control unit in communication with the rest of the units of the microscope.

Whether it be the excitation unit or the additional excitation unit, depending on the example of embodiment, it is adapted for exciting the two natural vibration modes of the microlever M by means of a single excitation signal $F_i \cos \omega_i t + F_j \cos \omega_j t$ consisting of the sum of those two excitation signals $F_i \cos \omega_i t$, $F_j \cos \omega_j t$ of frequencies substantially equal to those of the two natural vibration modes of the microlever M (or of other frequencies suitable for exciting the microlever in the two vibration modes) as shown in FIGS. 5 and 6.

Whether it be the excitation unit or the additional excitation unit, depending on the example of embodiment, it is adapted for detecting the said output signal $A_i \cos(\omega_i t - \phi_i) + A_j \cos(\omega_j t - \phi_j)$ representing the response of the microlever M to that excitation (generally in its tip) by means of the composite excitation signal $F_i \cos \omega_i t + F_j \cos \omega_j t$.

In the proposed microscope, and specifically in the said detection unit or said additional detection unit, it is adapted for decomposing into four channels the information contained in the output signal $A_i \cos(\omega_i t - \phi_i) + A_j \cos(\omega_j t - \phi_j)$ representing the response of the microlever M to that excitation by means of said composite excitation signal $F_i \cos \omega_i t + F_j \cos \omega_j t$: two channels with information referring to the amplitude $A_i$, $A_j$ of oscillation of the output signal $A_i \cos(\omega_i t - \phi_i) + A_j \cos(\omega_j t - \phi_j)$ for those two excitation frequencies and two channels referring to the phase (D, (j of the output signal $A_j \cos(\omega_i t-\phi_i)+A_j \cos(\omega_j t-\phi_j)$ for those two excitation frequencies.

Said excitation unit or said additional excitation unit, depending on the example of embodiment, is also adapted for sending that information $A_i$, $A_j$, $\phi_i$, $\phi_j$ contained in the said four channels to the control unit.

For the same example of embodiment illustrated by FIG. 6, the block labelled as AFM control unit has an output and four inputs for communicating with the second block illustrated and labelled as the bimodal control unit (also represented in FIG. 4), which is provided with separate analog-digital ADC converters and digital-analog DAC converters for two-way communication with the AFM control unit and the microlever M, respectively.

Via these four inputs the AFM control unit receives the information $A_i$, $A_j$, $\phi_i$, $\phi_j$ contained in the said four channels from the bimodal control unit, in order to then perform its analysis on it or send the information to the unit in charge of doing this.

For the same example of embodiment illustrated by FIG. 6, the additional excitation unit is adapted for:

receiving said excitation signal $F_i \cos \omega_i t$ from the said control unit for the microscope (as illustrated in FIG. 6) or generating it, generating the additional excitation signal $F_j \cos \omega_j t$, and summing the two excitation signals in order to generate a composite excitation signal $F_i \cos \omega_i t + F_j \cos \omega_j t$ and excite the microlever M with that composite signal $F_i \cos \omega_i t + F_j \cos \omega_j t$.

Following the above explanation of different examples of embodiment of the microscope proposed by the second aspect of the present invention, it can be emphasised that it is suitable for being used according to the method proposed by the first aspect of the present invention.

An expert in the subject would be able to introduce changes and modifications to the examples of embodiment that are described without going outside the scope of the invention as defined in the attached claims.

The invention claimed is:

1. A method of use of an atomic force microscope by means of amplitude modulation, of the type that comprises exciting a natural vibration mode of a microlever (M) of said microscope, arranged on a sample to examine, and analyzing at least the variation in amplitude ($A_i$) of oscillation of an output signal ($A_i \cos(\omega_i t-\phi_i)$), where t is the time and $\omega_i$ is the frequency of the microlever (M), representing the response of the microlever (M) to that excitation, in order to obtain topographical information on that sample, wherein said method further comprises an additional excitation of at least one other natural vibration mode of the microlever (M) such that at least two of said excitations of said natural vibration modes of the microlever (M) are carried out simultaneously, and analyzing at least the variation in phase ($\phi_i$) of an output signal ($A_i \cos(\omega_i t-\phi_i)$) representing the response of the microlever (M) to said additional excitation, in order to obtain compositional information on said sample is carried out by means of an excitation signal ($F_i \cos \omega_i t$) of higher frequency than the frequency of an excitation signal ($F_i \cos \omega_i t$) used for obtaining said topographical information.

2. The method according to claim 1, wherein said natural modes correspond to the first two natural modes of the microlever (M).

3. The method according to claim 1, wherein said natural modes correspond to any pair of natural vibration modes of the microlever (M), being consecutive or not consecutive.

4. The method according to claim 1, further comprising carrying out at least a third excitation consisting of exciting another natural vibration mode of the microlever (M) and analyzing the variation in amplitude and/or phase of an output signal representing the response of the microlever (M) to the third excitation in order to obtain topographical and/or compositional information on said sample.

5. The method according to claim 1, further comprising carrying out said at least two excitations of said natural vibration modes of the microlever (M) by means of a single composite excitation signal ($F_i \cos \omega_i t + F_j \cos \omega_j t$) composed of the sum of said two excitation signals ($F_i \cos \omega_i t$, $F_j \cos \omega_j t$).

6. The method according to claim 5, further comprising decomposing an output signal ($A_i \cos(\omega_i t-\Phi_i)+A_j \cos(\omega_j t-\Phi_j)$) representing the response of the microlever (M) to said excitation by means of said composite excitation signal ($F_i \cos \omega_i t + F_j \cos \omega_j t$), separating the parts of the composite excitation signal corresponding to the response to each of the at least two excitations, which are then subjected to at least the analysis of variation in their amplitude and/or phase.

7. An atomic force microscope of the type that comprises at least:

a microlever (M) to be arranged on a sample, a scanning unit associated with the microlever (M) and adapted for performing a scan with the microlever (M) on the sample or part thereof, an excitation unit adapted for exciting said microlever (M) with an excitation signal ($F_i \cos \omega_i t$) of frequency substantially equal to that of a natural vibration mode of said microlever (M), said excitation signal ($F_i \cos \omega_i t$) representing an excitation force, a force detection unit associated with the excitation unit for at least detecting the forces applied to and/or generated in the microlever (M), a detection unit adapted for detecting at least one output signal ($A_i \cos(\omega_i t-(\Phi_i))$) representing the response of the microlever M to the excitation signal, in order to monitor variations in the amplitude ($A_i$) of oscillation of the output signal ($A_i \cos(\omega_i t-\Phi_i)$) when performing the scan in order to obtain topographical information on the sample, an image conversion and processing unit adapted for at least transforming said variations in the amplitude ($A_i$) of oscillation of the output signal ($A_i \cos(\omega_i t-\Phi_i)$) into a topographical representation of the sample, and a control unit in communication with the rest of the units of the microscope for at least controlling their functioning, wherein the excitation unit or an additional excitation unit is adapted for additionally and simultaneously exciting the microlever (M) with another excitation signal ($F_j \cos \omega_j t$) of frequency substantially equal to that of another natural mode of vibration of said microlever (M), this excitation representing another excitation force, and wherein the excitation unit or the additional excitation unit is adapted for detecting an additional output signal ($A_{ji} \cos(\omega_{ji} t-\Phi_{ji})$) representing the response of the microlever (M) to the additional excitation, in order to monitor variation in the phase ($\Phi_{ji}$ of the additional output signal ($A_{ji} \cos(\omega_{ji} t-\Phi_{ji})$) when performing that scan in order to obtain compositional information on the sample.

8. The microscope according to claim 7, wherein said excitation unit is adapted for exciting said two natural modes of vibration of the microlever (M) by means of a single composite excitation signal ($F_i \cos \omega_i t + F_j \cos \omega_j t$) composed of the sum of those two excitation signals ($F_i \cos \omega_i t$, $F_j \cos \omega_j t$) of frequencies substantially equal to those of the two natural vibration modes of the microlever (M).

9. The microscope according to claim 8, wherein said detection unit is adapted for detecting an output signal ($A_i \cos(\omega_i t - \Phi_i) + A_j \cos(\Phi_j)$) representing the response of the microlever (M) to the excitation by means of the said composite excitation signal ($F_i \cos \omega_i t + F_j \cos \omega_j t$).

10. The microscope according to claim 9, wherein said detection unit is adapted for decomposing into four channels the information contained in the output signal ($A_i \cos(\omega_i t - \Phi_i) + A_j \cos(\omega_j t - \Phi_j)$) representing the response of the microlever (M) to the excitation by means of said composite excitation signal ($F_i \cos \omega_i t + F_j \cos \omega_j t$), said four channels including two channels with information referring to the amplitude ($A_i$, $A_j$) of oscillation of the output signal ($A_i \cos(\omega_i t \Phi_i) + A_j \cos(\omega_j t - \Phi_j)$) for those two excitation frequencies and two channels referring to the phase ($\Phi_i$, $\Phi_j$) of the output signal ($A_i \cos(\omega_i t - \Phi_i) + A_j \cos(\omega_j t - \Phi_j)$) for those two excitation frequencies.

11. The microscope according to claim 10, wherein said detection unit is adapted for sending said information ($A_i$, $A_j$, $\Phi_i$, $\Phi_j$) contained in said four channels to said control unit.

12. The microscope according to claim 7, wherein said additional excitation unit and said additional detection unit are in charge of respectively carrying out the additional excitation and detection of said additional output signal ($A_j \cos(\omega_j t - \Phi_j)$) and said monitoring of the variation of its phase ($\Phi_j$) and both units form part of a bimodal control module included in said microscope or external thereto, but in both cases connectable to at least said control unit for the microscope.

13. The microscope according to claim 12, wherein:
said additional excitation unit is adapted for:
  receiving said excitation signal ($F_i \cos \omega_i t$) from said control unit for the microscope, or generating said excitation signal,
  generating at least said additional excitation signal ($F_j \cos \omega_j t$), and
  summing the two excitation signals in order to generate a composite excitation signal ($F_i \cos \omega_i t + F_j \cos \omega_j t$) and excite the microlever (M) with the composite signal ($F_i \cos \omega_i t + F_j \cos \omega_j t$), and
wherein said additional excitation unit is adapted for detecting an output signal ($A_i \cos(\omega_i t - \Phi_i) + A_j \cos(\omega_j t - \Phi_j)$) representing the response of the microlever (M) to said excitation by means of said composite excitation signal ($F_i \cos \omega_i t + F_j \cos \omega_j t$).

14. The microscope according to claim 13, wherein said additional detection unit is adapted for:
decomposing into four channels the information contained in the output signal ($A_i \cos(\omega_i t - \Phi_i) + A_j \cos(\omega_j t - \Phi_j)$) representing the response of the microlever (M) to said excitation signal by means of said composite excitation signal ($F_i \cos \omega_i t + F_j \cos \omega_j t$): said four channels including two channels with information referring to the amplitude ($A_i$, $A_j$) of oscillation of said output signal ($A_i \cos(\omega_i t - \Phi_i) + A_j \cos(\omega_j t - \Phi_j)$) for said two excitation frequencies and two channels referring to the phase ($\Phi_i$, $\Phi_j$) of said output signal ($A_i \cos(\omega_i t - \Phi_i) + A_j \cos(\omega_j t - \Phi_j)$) for said two excitation frequencies, and for
sending the information ($A_i$, $A_j$, $\Phi_i$, $\Phi_j$) contained in said four channels to said control unit of the microscope.

* * * * *